(12) United States Patent
Garimella et al.

(10) Patent No.: US 11,880,648 B2
(45) Date of Patent: Jan. 23, 2024

(54) AUTOMATIC SEMANTIC LABELING OF FORM FIELDS WITH LIMITED ANNOTATIONS

(71) Applicant: ADOBE INC., San Jose, CA (US)

(72) Inventors: Aparna Garimella, Telangana (IN); Sumit Shekhar, Karnataka (IN); Bhanu Prakash Reddy Guda, Doddanekundi (IN); Vinay Aggarwal, Delhi (IN); Vlad Ion Morariu, Potomac, MD (US); Ashutosh Mehra, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/456,143

(22) Filed: Nov. 22, 2021

(65) Prior Publication Data
US 2023/0161952 A1     May 25, 2023

(51) Int. Cl.
| | | |
|---|---|---|
| *G06F 40/174* | (2020.01) | |
| *G06F 40/30* | (2020.01) | |
| *G06F 40/284* | (2020.01) | |
| *G06N 3/045* | (2023.01) | |

(52) U.S. Cl.
CPC .......... *G06F 40/174* (2020.01); *G06F 40/284* (2020.01); *G06F 40/30* (2020.01); *G06N 3/045* (2023.01)

(58) Field of Classification Search
CPC ...... G06F 40/174; G06F 40/284; G06F 40/30; G06N 3/0454
See application file for complete search history.

(56) References Cited

U.S. PATENT DOCUMENTS

| | | | |
|---|---|---|---|
| 11,074,412 B1* | 7/2021 | Leeman-Munk | ........ G06N 3/08 |
| 11,461,829 B1* | 10/2022 | Wang | ................. G06Q 30/0603 |
| 2006/0031202 A1* | 2/2006 | Chang | ................... G06F 40/211 |
| 2006/0061806 A1* | 3/2006 | King | ....................... G06F 16/58 |
| | | | 358/1.15 |
| 2008/0120257 A1* | 5/2008 | Goyal | ................... G06F 40/174 |
| | | | 706/12 |
| 2020/0125840 A1* | 4/2020 | Geng | ..................... G06F 40/174 |
| 2021/0089828 A1* | 3/2021 | Arik | ........................ G06N 3/006 |
| 2021/0383067 A1* | 12/2021 | Reisswig | ............... G06F 40/295 |

(Continued)

OTHER PUBLICATIONS

Aggarwal, C.C., et al., "Active learning: A survey," CRC Press, Chapter 22, pp. 571-605 (2014).

(Continued)

*Primary Examiner* — Keith D Bloomquist
(74) *Attorney, Agent, or Firm* — Shook, Hardy & Bacon L.L.P.

(57) ABSTRACT

Embodiments provide systems, methods, and computer storage media for extracting semantic labels for field widgets of form fields in unfilled forms. In some embodiments, a processing device accesses a representation of a fillable widget of a form field of an unfilled form. The processing device generates an encoded input representing text and layout of a sequence of tokens in a neighborhood of the fillable widget. The processing device uses a machine learning model to extract a semantic label representing a field type of the fillable widget in view of the encoded input. The processing device causes execution of an action using the semantic label.

19 Claims, 8 Drawing Sheets

```
             ╭210                        ╭220
             ↓                           ↓
┌─────────────────────────┐  ┌─────────────────────────┐
│LOYOLA    o              │  │LOYOLA    o              │
│MISSING   o              │  │MISSING   o              │
│RECEIPT   o              │  │RECEIPT   o              │
│AFFIDAVIT     o          │  │AFFIDAVIT     o          │
│LAW       o              │  │LAW       o              │
│SCHOOL    o              │  │SCHOOL    o              │
│|LOS      o              │  │|LOS      o              │
│ANGELES.      o          │  │ANGELES.      o          │
│Form      o              │  │Form      o              │
│of        o              │  │of        o              │
│payment   o              │  │payment   o              │
│for       o              │  │for       o              │
│this      o              │  │this      o              │
│purchase:     o          │  │purchase:     o          │
│☉         o              │  │☉         o              │
│[widget]      S-CHECKBOX │  │Pcard     o              │
│Pcard     o              │  │☉         o              │
│☉         o              │  │Check     o              │
│Check     o              │  │☉         o              │
│☉         o              │  │Electronic    o          │
│Electronic    o          │  │1         o              │
│1         o              │  │[widget]      S-TEXT_FIELD│
│have      o              │  │have      o              │
└─────────────────────────┘  └─────────────────────────┘
```

(56) References Cited

U.S. PATENT DOCUMENTS

| | | | | |
|---|---|---|---|---|
| 2022/0230089 | A1* | 7/2022 | Peraud | G06N 3/084 |
| 2023/0101746 | A1* | 3/2023 | Manandise | G06F 40/174 |
| | | | | 704/9 |

OTHER PUBLICATIONS

Brust, C.-A., et al., "Active and incremental learning with weak supervision," KI—Künstliche Intelligenz, vol. 34, No. 2, pp. 165-180 (2020).

Davis, B., et al., "Deep visual template-free form parsing," 2019 International Conference on Document Analysis and Recognition (ICDAR), 9 pages (2019).

Devlin, J., et al., "BERT: Pre-training of deep bidirectional transformers for language understanding," arXiv preprint arXiv:1810.04805, 14 pages (Oct. 11, 2018).

Fang, M., et al., "Learning how to active learn: A deep reinforcement learning approach," arXiv preprint arXiv:1708.02383, 11 (pages Aug. 8, 2017).

Gal, Y., et al., "Deep Bayesian active learning with image data," Proceedings of the 34th International Conference on Machine Learning, vol. 70, pp. 1183-1192 (2017).

Katti, A.R., et al., "Chargrid: Towards understanding 2d documents," EMNLP 2018, arXiv preprint arXiv:1809.08799, 11 pages (2018).

Liu, M., et al., "Learning how to actively learn: A deep imitation learning approach," In Proceedings of the 56th Annual Meeting of the Association for Computational Linguistics, vol. 1, Long Papers, pp. 1874-1883 (2018).

Liu, Z., et al., "Deep reinforcement active learning for human-in-the-loop person re-identification," In 2019 IEEE/CVF International Conference on Computer Vision (ICCV), pp. 6122-6131 (2019).

Majumder, B.P., et al., "Representation learning for information extraction from form-like documents," Proceedings of the 58th Annual Meeting of the Association for Computational Linguistics, pp. 6495-6504 (2020).

Pramanik, S., et al., "Towards a multi-modal, multi-task learning based pre-training framework for document representation learning," CoRR, arXiv:2009.14457v2, 11 pages (Jan. 5, 2022).

Roy, S., et al., "Deep active learning for object detection," in BMVC, 12 pages (2018).

Settles, B., "Active learning literature survey," Technical report, University of Wisconsin-Madison, Department of Computer Sciences, 47 pages (2009).

Xu, Y., et al., "LayoutLM: Pre-training of text and layout for document image understanding," Proceedings of the 26th ACM SIGKDD International Conference on Knowledge Discovery & Data Mining, pp. 1192-1200 (2020).

Yu, W., et al., "Pick: processing key information extraction from documents using improved graph learning—convolutional networks," 2020 25th International Conference on Pattern Recognition (ICPR), 8 pages (2020).

Zhang, P., et al. "TRIE: End-to-End Text Reading and Information Extraction for Document Understanding," Proceedings of the 28th ACM International Conference on Multimedia, 9 pages (May 27, 2020).

Wang, D., & Shang, Y. (Jul. 2014). A new active labeling method for deep learning. In 2014 International joint conference on neural networks (IJCNN) (pp. 112-119). IEEE.

"Adobe Acrobat Read DC, free PDF viewer download", Web page <https://get.adobe.com/uk/reader/>, 1 page, retrieved from Internet Archive Wayback Machine <https://web.archive.org/web/20210804143915/https://get.adobe.com/uk/reader/otherversions/> on Aug. 4, 2021.

"Acrobat Sign: E-signatures & digital signing software", Web page <https://acrobat.adobe.com/in/en/sign.html/>, 1 page, retrieved from Internet Archive Wayback Machine <https://web.archive.org/web/20220223072748/https://www.adobe.com/sign.html> on Aug. 4, 2021.

"[Offical] Wondershare PDFelement | PDF Editor Software", Web page <https://pdf.wondershare.com/>, 1 page, retrieved from Internet Archive Wayback Machine <https://web.archive.org/web/20210811005224/https://pdf.wondershare.com/> on Aug. 11, 2021.

"Soda PDF—PDF Software to Create, Convert, Edit and Sign Files", Web page <https://www.sodapdf.com/>, 1 page, retrieved from Internet Archive Wayback Machine <https://web.archive.org/web/20210730070648/https://www.sodapdf.com/> on Jul. 30, 2021.

"Accusoft | Home", Web page <https://www.accusoft.com/>, 1 page, retrieved from Internet Archive Wayback Machine <https://web.archive.org/web/20210801014733/https://www.accusoft.com/> on Aug. 1, 2021.

"Enable Auto-Complete feature to fill in a from—Help Center | Foxit Software", Web page <https://kb.foxitsoftware.com/hc/en-us/articles/360040240432-Enable-Auto-Complete-feature-to-fill-in-a-form>, 1 page, retrieved from Internet Archive Wayback Machine <https://web.archive.org/web/20210510053048/https://kb.foxitsoftware.com/hc/en-us/articles/360040240432-Enable-Auto-Complete-feature-to-fill-in-a-form> on May 10, 2021.

"How to auto-populate multiple fields in a form | Fluix", Web page <https://fluix io/help/auto-populate-text-in-multiple-fields>, 1 page, retrieved from Internet Archive Wayback Machine <https://web.archive.org/web/20220510212708/https://fluix.io/help/auto-populate-text-in-multiple-fields> on May 10, 2022.

"Auto Fill Forms & Multiple PDF Documents | pdfFiller", Web page <https://www.pdffiller.com/en/auto-fill-forms.htm>, 1 page, retrieved from Internet Archive Wayback Machine <https://web.archive.org/web/20210901152334/https://www.pdffiller.com/en/auto-fill-forms.htm> on Sep. 1, 2021.

"Form Filler—RoboForm", Web page <https://www.roboform.com/form-filler>, 1 page, retrieved from Internet Archive Wayback Machine <https://web.archive.org/web/20210813011156/https://www.roboform.com/form-filler> on Aug. 13, 2021.

"Autofill forms in one click—Free | Dashlane", Web page <https://www.dashlane.com/features/autofill>, 1 page, retrieved from Internet Archive Wayback Machine <https://web.archive.org/web/20211118204058/https://www.dashlane.com/features/autofill> on Nov. 18, 2021.

* cited by examiner

```
LOYOLA     o
MISSING    o
RECEIPT    o
AFFIDAVIT      o
LAW        o
SCHOOL     o
|LOS       o
ANGELES.       o
Form       o
of         o
payment    o
for        o
this       o
purchase:      o
©          o
[widget]       S-CHECKBOX
Pcard      o
©          o
Check      o
©          o
Electronic     o
l          o
have       o
```

220

```
LOYOLA     o
MISSING    o
RECEIPT    o
AFFIDAVIT      o
LAW        o
SCHOOL     o
|LOS       o
ANGELES.       o
Form       o
of         o
payment    o
for        o
this       o
purchase:      o
©          o
Pcard      o
©          o
Check      o
©          o
Electronic     o
l          o
[widget]       S-TEXT_FIELD
have       o
```

Example Form

Owner/Occupant's Name:

| B1 | B2 | B3 |
| First Name | Middle Initial | Last Name |

410

1. Subject Property Address:

| B4 | B5 | B6 | B7 |
| Street Address | City | State | Zip Code |

420

2. Lorem ipsum dolor sit amet, consectetur adipiscing elit aenean at neque elementum: [B8] Yes [B9] No 3. Cras ultrices ligula eget hendrerit viverra rutrum: [B10]

4. Donec malesuada tellus elit, sed accumsan purus ut: [B10]

5. Nunc tempus dolor id tincidunt laoreet dui: [B10]

430

6. Mailing Address:

| B13 | B14 | B15 | B16 |
| Street Address | City | State | Zip Code |

7. Day time phone number: [B17]   Email: [B18]

I declare, under penalty of perjury that this statement is complete and correct.

8. Signed: [B19] Owner/Occupant   Date: [B20]

440

APPROVED:

Signature: [B21] Department Representative   Date: [B22]

Example Form

Owner/Occupant's Name:

| Text | Text | 510 Text |
|---|---|---|
| First Name | Middle Initial | Last Name |

1. Subject Property Address:

| Text | Text | Text | 520 Numeric |
|---|---|---|---|
| Street Address | City | State | Zip Code |

2. Lorem ipsum dolor sit amet, consectetur adipiscing elit aenean at neque elementum: ☐ Yes ☐ No 3. Cras ultrices ligula eget hendrerit viverra rutrum: [ Text ]

4. Donec malesuada tellus elit, sed accumsan purus ut: [ Date ]

5. Nunc tempus dolor id tincidunt laoreet dui: [ Date ]
530

6. Mailing Address:

| Text | Text | Text | Numeric |
|---|---|---|---|
| Street Address | City | State | Zip Code |

7. Day time phone number: [ Numeric ]  Email: [ Text ]

I declare, under penalty of perjury that this statement is complete and correct.

8. Signed: [ Signature ]  Date: [ Date ]
Owner/Occupant
540

APPROVED:

Signature: [ Signature ]  Date: [ Date ]
Department Representative

AUTOMATIC SEMANTIC LABELING OF FORM FIELDS WITH LIMITED ANNOTATIONS

BACKGROUND

Forms are documents with placeholders to fill data or select choices from a list of options. Usually, the placeholders are called widgets or field widgets, the text associated with widgets are called labels or text labels, and the widgets and labels together constitute the fields or form fields in any given form. Forms are used in almost every domain, and they include financial forms, tax forms, orders, and checks, among many others. Forms can be filled and unfilled. Unfilled forms (forms that are not yet filled) contain two broad types of content: static content (e.g., parts of the forms that do not change, such as text labels for fields), and placeholders or widgets that are usually bounding boxes inside which a user can write, type, or otherwise fill in.

SUMMARY

Embodiments of the present invention are directed to extracting semantic labels for fillable field widgets of form fields in unfilled forms. In some embodiments, a sequence of tokens surrounding a field widget is encoded into an embedding that represents the widget's textual and layout context. The embedding is passed through a first portion of a neural network to extract a contextual embedding, and the portion of the contextual embedding corresponding to the position of the field widget in the sequence is passed through a second portion of the neural network comprising a multi-class classifier to predict the best semantic label. Some embodiments use a hierarchical taxonomy of semantic labels with multiple levels of semantic classification, and the multi-class classifier has a number of classes that corresponds to a lowest level of the hierarchical taxonomy. To address the lack of labelled training datasets for form field semantic detection, in some embodiments, the neural network is trained in cycles of active learning to optimize a sample selection model to select the best samples for training.

There are a variety of ways to use extracted semantic labels for form field widgets. In an example paper form digitization workflow, an author scans a paper form, object detection is applied to detect fields, fillable field widgets are created, semantic labels are extracted, and the extracted semantic labels are assigned to the fillable field widgets (e.g., as field metadata). In some embodiments in which a semantic label represents a field type, assigning the semantic label to its field widget configures the field widget to accept only valid inputs of a corresponding data type (e.g., text, numeric, date, signature) and reject invalid inputs of a different data type. Thus, extracting and assigning semantic labels simplifies the authoring experience for digital forms. In an example form filling workflow, extracted semantic labels are used to auto-fill or auto-suggest values from a profile that stores data that was previously filled in a field widget having the same semantic label. Thus, extracting and assigning semantic labels simplifies the form filling experience for digital forms.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Forms are a ubiquitous class of document, and there are a number of workflows that rely on converting paper forms to digital. For example, certain form filling or e-signature applications allow users to create fillable forms or digital documents (e.g., contracts) to be signed. Many times, an initiator will start with a paper document, digitize (e.g., scan, apply optical character recognition (OCR)) the paper document, and create the desired fields and field types by hand, before sending the resulting digital form out to its recipients. However, authoring that involves manually creating the desired fields and field types is tedious, time-consuming, and error-prone, and it requires and consumes computing resources to navigate the document, identify each desired field, and assign a corresponding field type.

In another example, a user may want to fill out a digital form, but the form has not had the relevant fields or field types created yet. The form may include underlined regions or bounding boxes, but there are many situations where the fields have no associated metadata that identifies the fields as something to be filled in, or that identifies the type of input data the field should accept. Some applications may recognize underlined regions or bounding boxes as blank fields, but typically these applications will accept any kind of unstructured textual input into those fields, including inputs of an incorrect type. Ideally, invalid inputs of an incorrect type should not should not be accepted, but conventional systems typically have no way of identifying field type in situations like this.

More specifically, although there are several works that extract different types of information from digital and scanned documents, these techniques do not address how to obtain semantic labels for the various field widgets that lack field metadata in unfilled forms. For example, some prior techniques use OCR and/or shape recognition technologies (box, circle, diamond, etc.) to evaluate a document and place candidate fields where landmarks on a page of the document indicate that fields are likely needed. Some techniques can suggest data to fill in the fields of a form. However, to our knowledge, these prior works do not detect semantic labels for many field widgets that commonly appear in unfilled forms (e.g., full name, father's name, company address, work phone number, etc.). Some techniques contemplate automatic detection and filling of web forms. However, form fields in web forms typically include metadata, so those prior techniques are not instructive on obtaining semantic labels for field widgets that lack field metadata.

Furthermore, an obstacle to automatic detection of semantic labels for field widgets in unfilled forms is the limited amount of relevant, labeled training data. Initially, the nature of identifying semantic labels for form fields is complex due to the many unique fields in various forms, as well as the diversity of these fields, and this makes obtaining annotations for field semantics an expensive and time-consuming task. Active learning has been used for other tasks to reduce requisite labelling efforts, typically by seeking to select training samples that are most informative and that maximize the improvement in the learning of the underlying model. Most of the works using active learning depend on uncertainty estimates, which are better suited for simpler tasks such as image classification where there is a single entity present in a data sample. These approaches often fail in a more complex setup where there might be multiple entities present within the same sample, such as multiple fields in a form-like document, as there is no fixed way to aggregate the uncertainties of various entities present in the data sample. Furthermore, to our knowledge, active learning has not been leveraged to aid in understanding semantics of unfilled forms. Specifically for unfilled forms, some prior techniques have used heuristics or deep neural networks to determine the position of boxes to be filled, but not semantic labels of widgets in unfilled forms.

Accordingly, embodiments of the present invention are directed to extracting semantic labels for fields in unfilled forms, also referred to as form field semantic detection. In some embodiments, a language model predicts semantic labels from text and layout information representing the sequential context of unfilled field widgets. Each field widget to be labeled may be encoded into a (e.g., vector) representation of the neighboring context surrounding the field widget, including textual and layout information in a vicinity of the field widget. A sequence of tokens surrounding the field widget may be constructed, and the field widget itself may be represented in the sequence as a special widget token. The sequence may be encoded and fed forward through the language model, and the portion of the output vector corresponding to the widget token may be passed to a multi-class classifier and classified. Some embodiments use a hierarchical taxonomy of semantic labels with multiple levels of semantic classification (e.g., field type, field category, field sub-category), and the multi-class classifier may include a number of classes that corresponds to the number of semantic labels at the lowest level of the hierarchical taxonomy (e.g., leaf nodes). The class predicted with the highest confidence identifies a corresponding hierarchical classification for the field, and one or more semantic labels from the predicted hierarchical classification (e.g., representing a predicted field type, predicted name, or other predicted categorization) may be assigned to the field (e.g., as field metadata).

To address the lack of labelled training datasets for form field semantic detection, some embodiments use a small seed set of labeled forms to train the language model, and an active learning pipeline may use a sample selection model to intelligently select samples (e.g., form fields) from a set of unlabeled forms. The selected samples may be annotated and grouped with the seed set, and this augmented training data may be used to re-train the language model. The active learning pipeline may use the improvement in the performance of the language model as feedback to optimize the sample selection model during cycles of active learning. By using active learning and training the language model in cycles (of selecting some number of samples, augmenting the training data, and retraining the language model), the language model may be trained to perform accurately with substantially less training data and, therefore, using substantially fewer computational resources to annotate the training data.

Form field semantic detection has a number of applications. For example, some embodiments use form field semantic detection to auto-suggest or auto-fill values. In an example implementation of digital form filling, when a user completes one or more forms on his or her device and fills in a widget with form field data, the completed form field data may be stored in a profile in association with a corresponding semantic label for the widget. When completing future digital forms, the language model may be used to extract a semantic label for each field, the extracted semantic label may be matched to the user's profile to identify the completed form field data stored for that semantic label, and the completed form field data may be auto-suggested or auto-filled in the field. Unlike techniques that rely on string-matching, the present techniques may recognize similar fields despite having text labels that are not exact matches. In another example implementation, when a user digitizes a paper form to be filled, object detection may be applied to detect and create fields in the form, and the language model may be used to extract and apply a semantic label for each field. Accordingly, the form filling and authoring experiences in these respective scenarios are substantially simplified over prior techniques.

As such, using implementations described herein, form field semantic detection may be used to predict semantic labels for field widgets using textual and layout context in unfilled forms, providing new functionality over prior techniques. Using layout information in the extraction task contributes to performance over simply using textual information. Some embodiments use form field semantic detection to automatically detect and apply semantic labels during digital authoring, enabling a simplified authoring experience over prior techniques. Furthermore, some embodiments use form field semantic detection to auto-suggest or auto-fill values for field widgets, enabling a guided and simplified form-filling experience over prior techniques. By using active learning and training the language model in cycles, some embodiments train the language model with substantially less training data than otherwise would be necessary, boosting the efficacy of limited training data, enabling reasonable accuracy with substantially less training data, and using substantially fewer computational resources to annotate the training data.

Example Form Field Semantic Detection Environment

Figure 1:
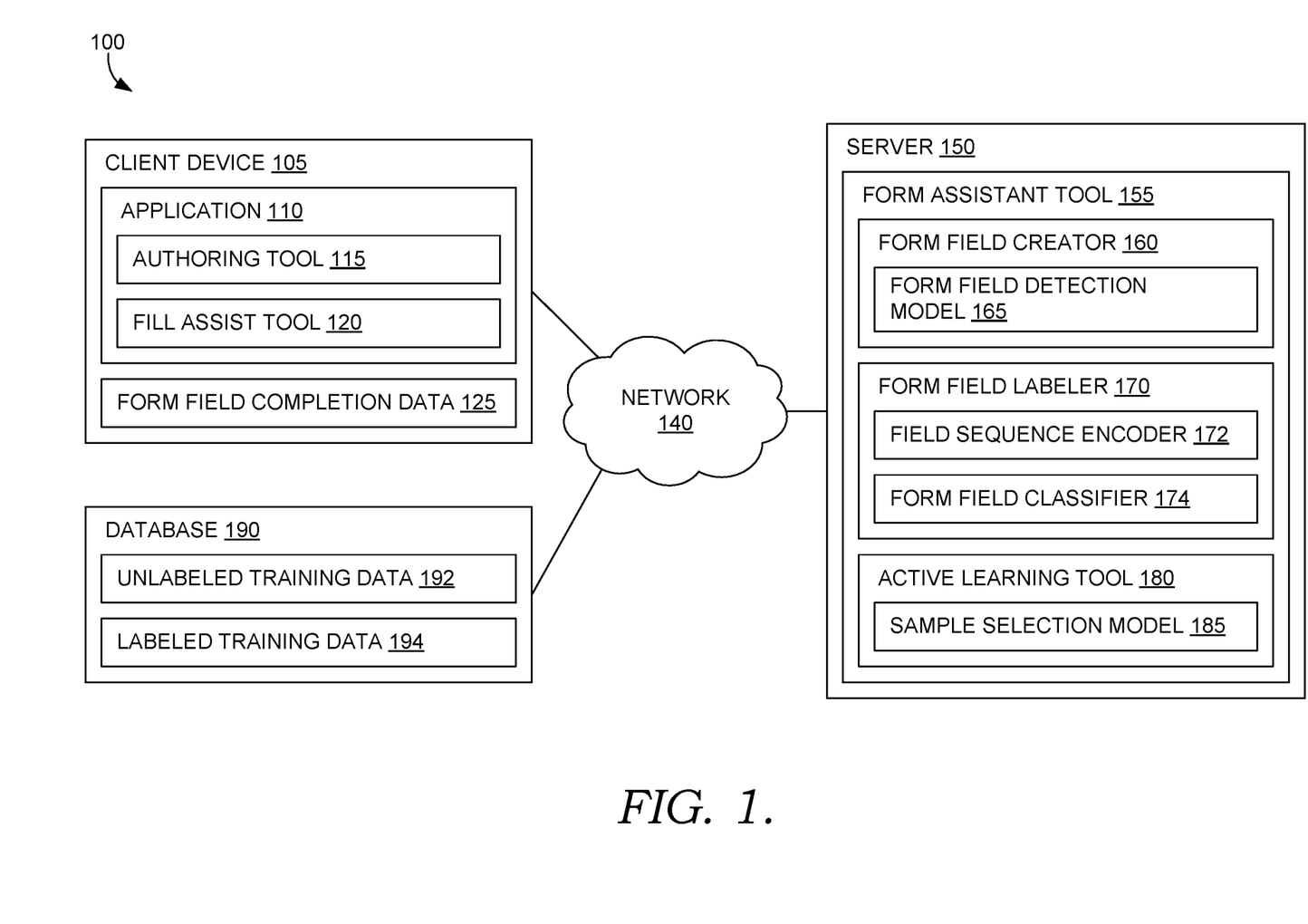
FIG. 1 is a block diagram of an example computing system suitable for extracting semantic labels for form fields, in accordance with embodiments of the present invention.

Referring now to FIG. 1, a block diagram of example environment 100 suitable for use in implementing embodiments of the invention is shown. Generally, environment 100 is suitable for and facilitates extraction of semantic labels for form fields. At a high level, environment 100 includes client device 105, server 150, and database 190.

Depending on the implementation, client device 105 and/or server 150 may be any kind of computing device capable of facilitating extraction of semantic labels for form fields. For example, in an embodiment, client device 105 and/or server 150 may each be a computing device such as computing device 800 of FIG. 8. In some embodiments, client device 105 and/or server 150 are a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

In various implementations, the components of environment 100 include computer storage media that stores information including data, data structures, computer instructions (e.g., software program instructions, routines, or services), and/or models (e.g., 3D models, machine learning models) used in some embodiments of the technologies described herein. For example, in some implementations, client device 105, server 150, and/or database 190 each comprise one or more data stores (or computer data memory). In some embodiments, one or more data stores are embodied as a distributed storage network and/or implemented in the cloud or using cloud storage.

In the example illustrated in FIG. 1, the components of environment 100 communicate with each other via a network 140. In some non-limiting example implementations, network 140 includes one or more local area networks (LANs) and/or wide area networks (WANs). Such networking environments are common in offices, enterprise-wide computer networks, intranets, and the Internet.

In the example illustrated in FIG. 1, client device 105 includes application 110 with authoring tool 115 and fill assist tool 120, and server 150 includes form assistant tool 155. In some embodiments, authoring tool 115, fill assist tool 120, form assistant tool 155, and/or any of the elements illustrated in FIG. 1 are incorporated, or integrated, into an application(s), or an add-on(s) or plug-in(s) to an application(s). In some embodiments, the application(s) is a stand-alone application, a mobile application, a web application, or the like. For example, in some implementations, the application(s) comprises a web application that runs in a web browser and/or is hosted at least partially server-side. In some cases, the application is integrated into an operating system (e.g., as a service). Some example applications include ADOBE® SIGN, a cloud-based e-signature service, and ADOBE ACROBAT®, which allows users to view, create, manipulate, print, and manage documents. Although some embodiments are described with respect to an application(s), some implementations additionally or alternatively integrate any of the functionality described herein into an operating system (e.g., as a service), a server (e.g., a remote server), a distributed computing environment (e.g., as a cloud service), and/or otherwise.

Depending on the embodiment, various allocations of functionality are implemented across any number and/or type(s) of devices. In the example illustrated in FIG. 1, authoring tool 115, fill assist tool 120, and/or form assistant tool 155 coordinate via network 140 to execute the functionality described herein. In another example, authoring tool 115, fill assist tool 120, and/or form assistant tool 155 (or some portion thereof) are integrated into a common application executable on a single device. In yet another example, authoring tool 115, fill assist tool 120, and/or form assistant tool 155 (or some portion thereof) are distributed across some other number and/or type(s) of devices. These are just examples, and any suitable allocation of functionality among these or other devices is possible within the scope of the present disclosure.

To begin with a high-level overview of an example workflow through the configuration illustrated in FIG. 1, a user operating client device 105 may use application 110 to digitize a paper form to be filled. In some cases, the user scans a paper document and/or accesses a digital version (e.g., an image) of the paper form in application 110. In some cases, the digital form was created using some other application (e.g., word processing software) and includes placeholders for fields (e.g., underlining, bounding boxes), but lacks metadata or other indication that the placeholders should be treated as form fields. Depending on the scenario, authoring tool 115 (or some other component) may execute OCR on the image to recognize text, communicate via network 140 to cause form assistant tool 155 (e.g., form field creator 160) to detect and create widgets for the fields of the form, and/or communicate via network 140 to cause form assistant tool 155 (e.g., form field labeler 170) to extract and assign semantic labels to the widgets for the fields. In some embodiments, assigning a semantic label to a particular widget serves to set a data type for the widget or otherwise configures the widget to accept only those inputs having that data type and to reject inputs having a different data type. In some cases, form assistant tool 155 creates and/or labels all the fields for the form. In other cases, form assistant tool 155 creates and/or labels one or more identified fields (e.g., one or more fields in which the user has clicked, tapped, or has otherwise identified using authoring tool 115). In some embodiments, form assistant tool 155 and/or application 110 create a digital representation of the form, include the created widget(s), semantic label(s), and/or form field(s) in the digital form, and provide access to the digital form (e.g., via a user interface of application 110). In some cases, authoring tool 115 provides tools that create, modify, edit, manipulate, move, designate, or otherwise identify form fields (e.g., position, size, semantic label), static content (e.g., text, images or graphics, text labels for form fields), and/or other elements of the digital form. As such, the user may use application 110 (or some other application) to author, access, and/or distribute a digital form (e.g., via network 140) for any user to fill or sign.

In another example workflow through the configuration illustrated in FIG. 1, fill assist tool 120 auto-fills or auto-suggests one or more values for form fields. In some embodiments, fill assist tool 120 collects form field completion data 125 filled by the user into a widget of a form field (e.g., in a profile associated with the user or account), and fill assist tool 120 associates form field completion data 125 with a corresponding semantic label of the form field. As such, fill assist tool 120 may use form field completion data 125 to auto-fill or auto-suggest one or more values in other form fields. For example, a user operating client device 105 may use application 110 to access a digital form to be filled in (e.g., a digital form authored using authoring tool 115). In some cases (e.g., if the digital form does not have recognizable form fields), application 110 communicates via network 140 to cause form assistant tool 155 to create widget(s) and/or assign semantic label(s) to the widget(s) of the form field(s), as described above. When a widget for a form field in the digital form is selected, created, or otherwise identified, fill assist tool 120 may identify a semantic label for the widget (e.g., by looking up a previously extracted semantic label, by causing form assistant tool 155 to extract a semantic label), access form field completion data 125 associated with the same semantic label in the user's (or account's) profile, and auto-fill the widget of the form field or auto-suggests filling the form field with the form field completion data 125. As such, fill assist tool 120 may assist with filling the digital form.

In the example implementation illustrated in FIG. 1, form assistant tool 155 includes form field creator 160, form field labeler 170, and active learning tool 180. At a high level, field creator 160 may create form fields and/or widgets for form fields, form field labeler 170 may extract and assign semantic labels to widgets and/or form fields, and active learning tool 180 may orchestrate training form field classifier 174 of form field labeler 170 in cycles of active learning.

Field creator 160 may detect and create form field widgets. More specifically, field creator 160 may include form field detection model 165. Generally, form field detection model 165 may be any suitable object detection model. In an example implementation, form field detection model 165 is a single-shot object detector that processes an image of a page using a convolutional neural network and outputs a representation of placement and size of predicted widgets for fields in the page. Any known form field detection technique is contemplated within the scope of the present disclosure. For each predicted widget (or each widget predicted with a threshold confidence), field creator 160 may create a corresponding (unlabeled) widget for the field in the digital form, including any applicable metadata representation of the widget (but without a corresponding semantic label).

Form field labeler 170 may extract and assign semantic labels to form fields. More specifically, form field labeler 170 may include field sequence encoder 172 and form field classifier 174. At a high level, field sequence encoder 172 may encode a sequence that represents the neighboring context of a field in a format that form field classifier 174 understands. The encoded sequence may be passed to form field classifier 174, which may extract a semantic label for the field from the encoded sequence.

Field sequence encoder 172 may encode a form field (e.g., each of a plurality of form fields) into a corresponding sequence that represents the neighboring context of the field, including textual and layout information in a vicinity of the field. Depending on the scenario, field sequence encoder 172 may be used to encode sequences for training and/or inference. For example, given a collection of digital forms (e.g., unlabeled training data 192, labeled training data 194), field sequence encoder 172 may convert the digital forms into training sequences and generate corresponding encoded training inputs, one for each field in each digital form. At inference time, field sequence encoder 172 may convert a field to be labeled into a corresponding encoded input.

In an example implementation, for a given field, field sequence encoder 172 may construct a sequence of tokens (e.g., 256 tokens) and generate an encoded input that represents the textual and layout context of the field based on the sequence of tokens. Generally, a page of a digital form may have text (e.g., words), and the text may have spatial location (e.g., coordinates of the bounding box for each character and/or word). In some embodiments, if text and/or spatial location of text in a page of a digital form has not already been recognized, form assistant tool 155 may execute OCR to recognize text and/or identify the spatial locations of the text (e.g., coordinates of bounding boxes for each character). Field sequence encoder 172 may construct the sequence for a particular field by traversing the page, for example, in a reading direction (e.g., using coordinates of the bounding boxes to advance from left to right, and from top to bottom), collecting text appearing in sequence. As such, the spatial locations of text on a page may be used to construct a sequence for a particular field with text that appears in sequence with the particular field in the digital form. For example, assume a field appears between two sequences of words. Field sequence encoder 172 may construct a sequence of tokens that represents the sequences of words that surround the field, placing a special token at a location in the sequence corresponding to the position of (i) the field in the sequence (e.g., a [widget] token), (ii) the beginning of the sequence (e.g., a [CLS] token), and (iii) the end of the sequence (e.g., an [SEP] token).

Figure 2:
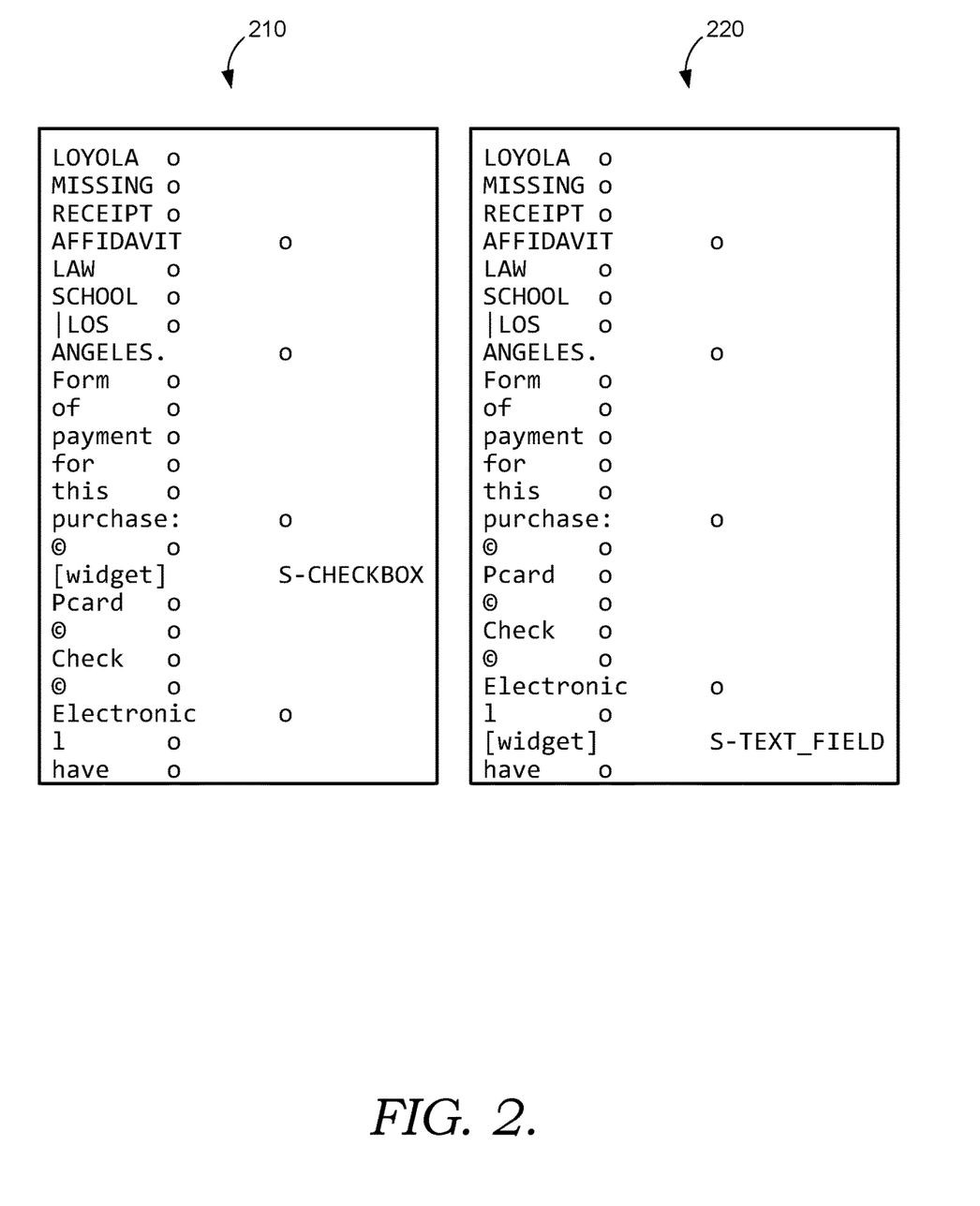
FIG. 2 is an illustration of example sequences of tokens in a neighboring context of example form fields, in accordance with embodiments of the present invention.

FIG. 2 is an illustration of example sequences of tokens in a neighboring context of example form fields, in accordance with embodiments of the present invention. In FIG. 2, sequences 210 and 220 in FIG. 2 are depicted as lists of tokens, and each form field is represented with a [widget] token and its corresponding semantic label. Note that in sequence 210, a checkbox widget is represented with a [widget] token, while in sequence 220, a text field widget is represented with a [widget] token. In some embodiments, each sequence represents exactly one form field, and any other form fields otherwise appearing in its context to the left and right may be skipped. In other embodiments, multiple form fields are represented in a single sequence. In some implementations, the position of a form field is placed at a middle position in its corresponding sequence (e.g., such that an equal number of tokens are used before and after it, if possible) to ensure that enough contextual information is encoded for each field.

Returning now to FIG. 1, in some cases, serializing forms and using only sequential textual context may omit information about other aspects such as document layout and token positions on two-dimensional images of forms. As such, in some embodiments, for each token in the sequence, field sequence encoder 172 identifies, extracts, accesses, and/or combines any number of embeddings representing different aspects of the token, and combines the embeddings for the different tokens in the sequence to generate an encoded input that represents the sequence of context for a particular field. Example embeddings for different aspects of a particular token include a semantic or language embedding representing the meaning of the particular token (extracted using any known technique, looked up from a table), an order embedding representing the position of the particular token in the sequence (e.g., representing position 1-256), one or more spatial embeddings representing a position associated with the token on a page (e.g., multiple embeddings of representative coordinates of the token's bounding box, such as corner and/or center coordinates), and/or a visual embedding of an image of the token (e.g., extracted any known image encoder such as FastRCN from an image cropped to the bounding box of the token, optionally with padding). In an example implementation, one or more different embeddings for a particular token are combined (e.g., added, concatenated) before feeding a combined embedding into form field classifier 174. Additionally or alternatively, one or more embeddings (e.g., a visual embedding) for the token may be combined using late fusion (e.g., applying an encoded input to form field classifier 174, combining the visual embedding with an output from a particular layer of form field classifier 174 such as a spatial and language embedding output by a transformer of form field classifier 174, and passing the resulting combined embedding to one or more subsequent layers of form field classifier 174). In an example implementation, field sequence encoder 172 concatenates embeddings for the different tokens into an encoded input that represents the neighboring context of a field and is in a format that form field classifier 174 understands.

Generally, form field classifier 174 may include any suitable language model that evaluates an encoded representation of text and layout context of a form field (e.g., using attention to accumulate contextual signals from nearby tokens) and predicts a semantic label for the form field from the encoded text and layout context. In an example implementation, form field classifier 174 includes a neural network such as LayoutLM or Layout-Aware language Modeling using BERT (LAMBERT). In some embodiments, form field classifier 174 accepts and processes an encoded input representing a sequence of tokens to generate a contextual embedding corresponding to each token in the sequence, and the contextual embedding for the [widget] token(s) in the sequence may be fed into a classification layer of form field classifier 174 to predict a semantic label for the widget.

Figure 3:
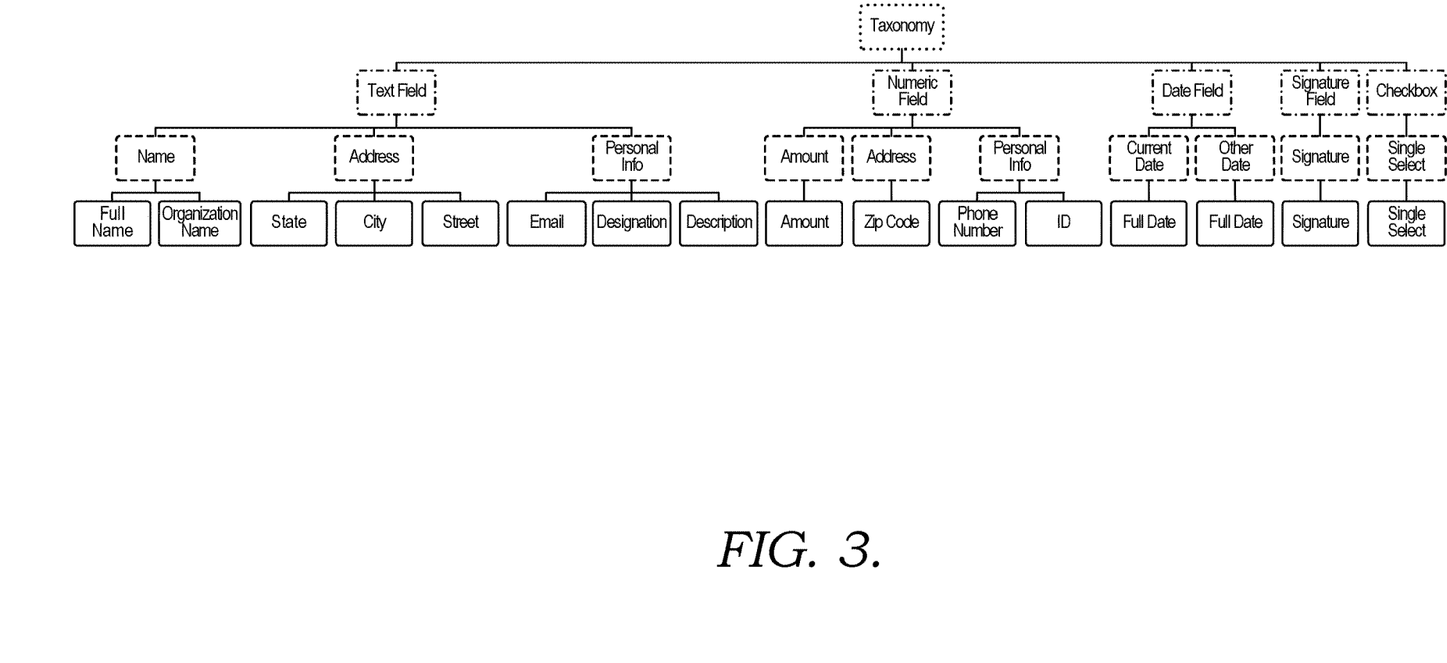
FIG. 3 is an illustration of an example hierarchical taxonomy of semantic labels for form fields, in accordance with embodiments of the present invention.

Some embodiments use a hierarchical taxonomy of semantic labels with multiple levels of semantic classification, such as the example hierarchical taxonomy illustrated in FIG. 3. This example hierarchical taxonomy represents the semantic meaning of possible form fields in different levels: field type, field category, field sub-category. In this example, field type represents a data type of data accepted by the field's widget (e.g., text, numeric, signature). Field category represents a categorization or naming of the field (e.g., name, address, personal information). Field sub-category represents finer-grained information (e.g., first name, last name, city, street, email). The taxonomy illustrated in FIG. 3 is meant simply as an example, and other taxonomies are possible in other implementations.

Returning now to FIG. 1, in an example implementation, form field classifier 174 includes a classification layer with a number of nodes (e.g., classes) that corresponds to the number of semantic labels at the lowest level of the hierarchical taxonomy (e.g., leaf nodes). As such, the class predicted with the highest confidence identifies a corresponding hierarchical classification for the field (e.g., including a leaf node representing a predicted semantic label and its parent nodes, such as a parent node representing a predicted field type in the taxonomy). Thus, in this implementation, form field labeler 170 may assign to a widget of the field and/or to the field one or more semantic labels from the predicted hierarchical classification (e.g., representing a predicted field type, predicted name, or other predicted categorization). Form field labeler 170 may repeat the process for any number of fields (e.g., for each field in a digital form) to extract and assign a semantic label representing a field type, name, and/or other categorization for each field.

Figure 4:
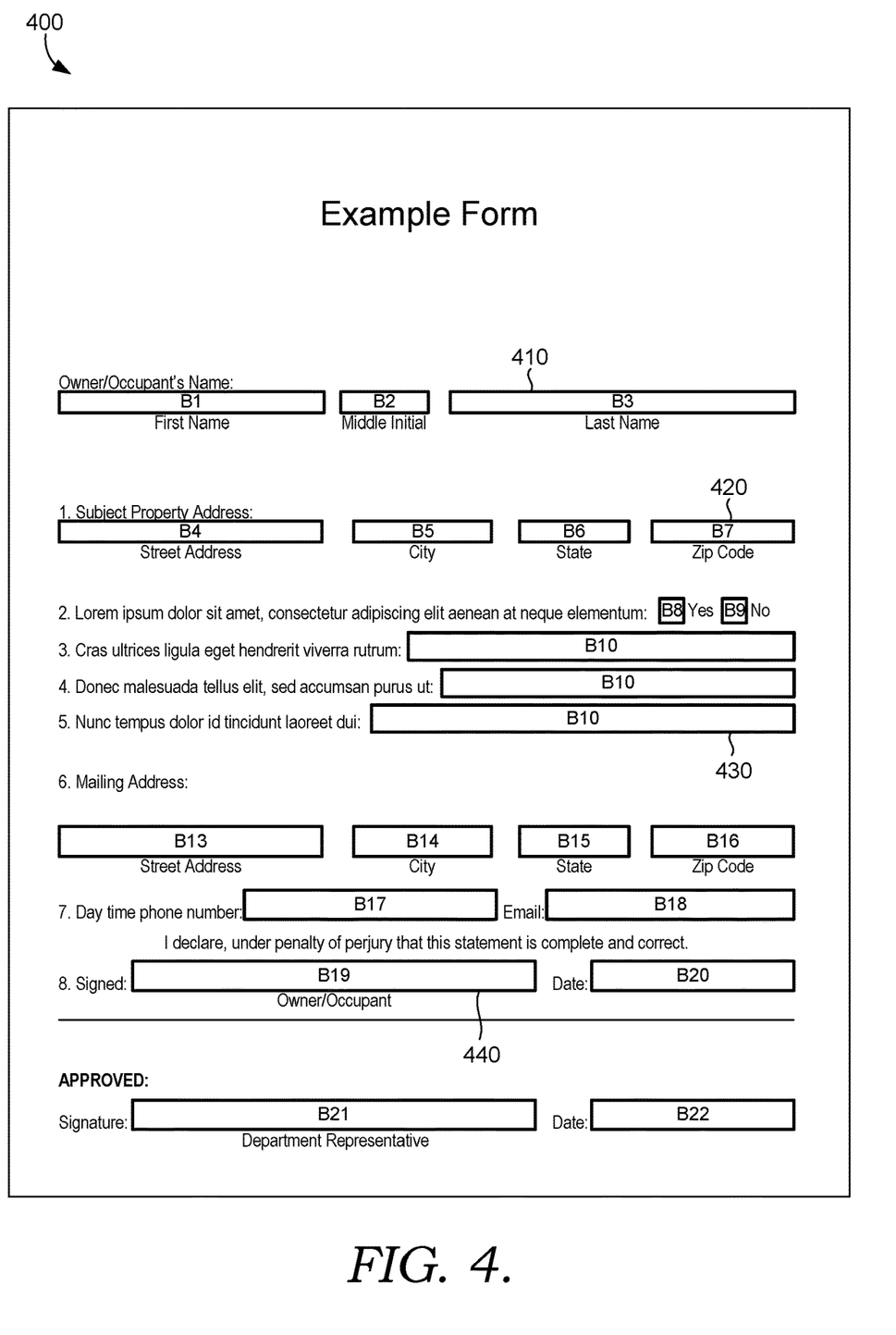
FIG. 4 is an illustration of an example unfilled form without semantic labels for form fields, in accordance with embodiments of the present invention.
Figure 5:
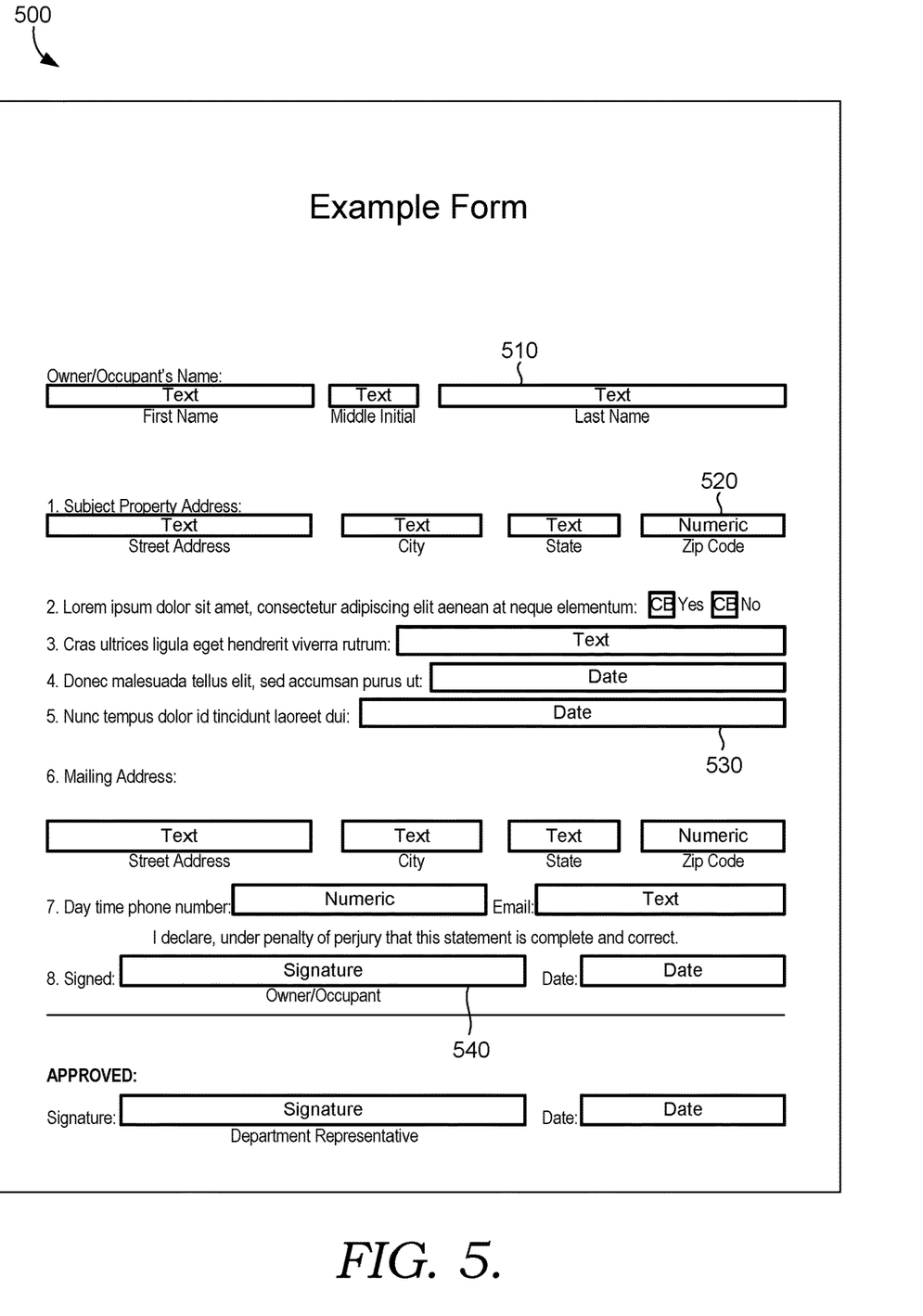
FIG. 5 is an illustration of an example unfilled form with semantic labels for form fields, in accordance with embodiments of the present invention.

FIG. 4 is an illustration of an example unfilled form 400 without semantic labels for form fields, and FIG. 5 is an illustration of an example unfilled form 500 with semantic labels for form fields, in accordance with embodiments of the present invention. As illustrated in FIG. 4, each form field (e.g., fields 410, 420, 430, 440) in unfilled form 400 has been assigned an identification number to assist with processing. After processing (e.g., by form field labeler 170 of FIG. 1), each form field (e.g., its corresponding widget) may be assigned one or more predicted semantic labels (e.g., corresponding to one or more levels of a predicted hierarchical classification, configuring the widget so it only accepts inputs of a particular data type, such as text, numeric, date, signature, checkbox, etc.). As such, in FIG. 5, the field widgets of unfilled form 500 are illustrated with their corresponding data types. For example, field 510 is assigned a semantic label indicating it is a text type field, field 520 is assigned a semantic label indicating it is a numeric type field, field 530 is assigned a semantic label indicating it is a date type field, and field 540 is assigned a semantic label indicating it is a signature type field.

Returning now to FIG. 1, active learning tool 180 may orchestrate training form field classifier 174 of form field labeler 170 in cycles of active learning. Generally, obtaining large quantities of real-world forms (even without semantic label annotations) is not straightforward and can be expensive and time-consuming. As such, in some embodiments, active learning tool 180 uses a relatively small seed set of labeled training data 194 (e.g., encoded training inputs representing fields from unfilled forms with annotated ground truth semantic labels) to train form field classifier 174. Sample selection model 185 of active learning tool 180 may select samples (e.g., encoded training inputs and/or unlabeled forms) from unlabeled training data 192. The selected samples may be annotated and grouped with the seed set of labeled training data 194, and active learning tool 180 may use this augmented labeled training data 194 to re-train form field classifier 174. Active learning tool 180 may use the improvement in the performance of form field classifier 174 as feedback to optimize sample selection model 185 during cycles of active learning.

In an example implementation, unlabeled training data 192 comprises a large collection of unlabeled, unfilled forms. In the event the forms do not already have fields created, fields may be detected and created (e.g., by form field creator 160). Each field may be converted into a corresponding encoded training input (e.g., by field sequence encoder 172). Thus, unlabeled training data 192 may include a collection of fields and corresponding encoded training inputs.

Active learning tool 180 may train sample selection model 185 through episodes of reinforcement learning where the actions are the choice of samples (e.g., encoded training inputs from unlabeled training data 192) and the rewards are feedback representing an improvement in the performance of form field classifier 174 resulting from training with the selected samples. Each episode may include multiple cycles of active learning. In each cycle, active learning tool 180 may use sample selection model 185 to select fields (encoded training inputs) for labeling. Generally, sample selection model 185 may be any known sample selection model for an active learning framework, such as Deep Q-Network (DQN). The selected fields may be (e.g., manually) labeled with semantic labels and included in labeled training data 194, active learning tool 180 may use labeled training data 194 to train form field classifier 174, and active learning tool 180 may record the improvement in the performance of form field classifier 174. Active learning tool 180 may terminate the cycles of active learning upon reaching an estimated budget (e.g., a target number of labeled samples used to train form field classifier 174). At that point, active learning tool 180 may provide the improvement recorded during the cycles of active learning (e.g., class wise F1 score improvement) to sample selection model 185 as feedback, which may be used as a reward to optimize sample selection model 185. The process may be repeated over multiple episodes, for example, until sample selection model 185 converges. An example algorithm implemented by active learning tool 180 is illustrated in Algorithm 1 in which Π is sample selection model 185 and Θ is the form field classifier 174 trained for form field detection (FFD):

---
Algorithm 1 Training FFD
models using Active Learning
---

Input: training dataset T. estimated budget $B$ (in terms of number of samples).
Output: Trained model for FFD task.
1: Initialize active learning framework Π.
2: while Convergence of active learning model Π do
3:   Initialize LayoutLM model θ.
4:   Obtain new sequences on which the model θ needs to be trained using Π.
5:   Provide feedback, i.e improvement in θ's performance, to Π
6:   Re-do steps 3 - 5 until estimated budget $B$ is reached.
7:   Optimize model Π based on the feedback so far using reinforcement learning setup.
8: end while

---

As such, active learning tool 180 may optimize annotation costs of large-scale annotation projects (e.g., minimizes the amount of training data needed), avoiding the need to label all sequences in the dataset.

Example Flow Diagrams

Figure 6:
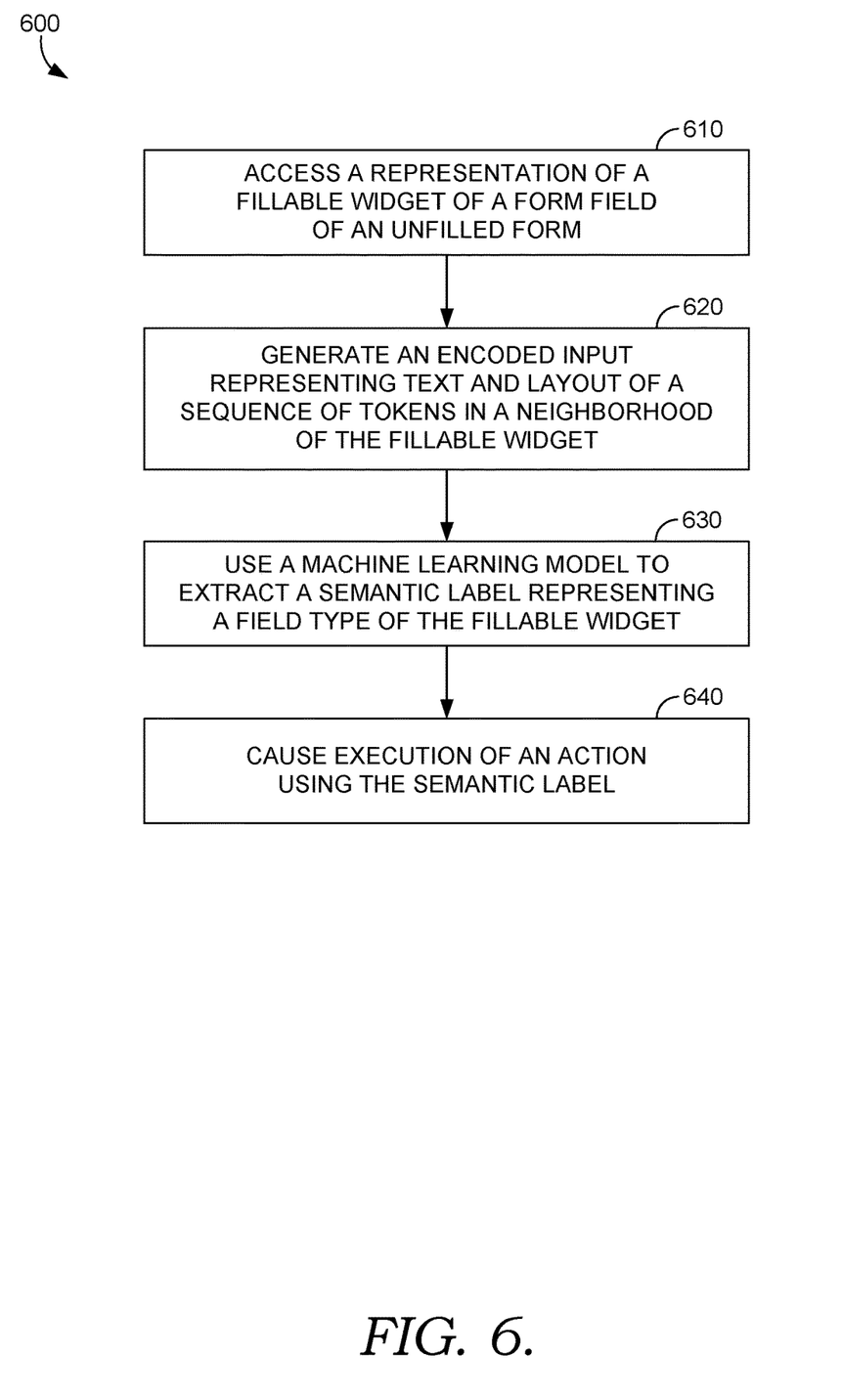
FIG. 6 is a flow diagram showing a method extracting a semantic label representing a field type of a fillable widget, in accordance with embodiments of the present invention.
Figure 7:
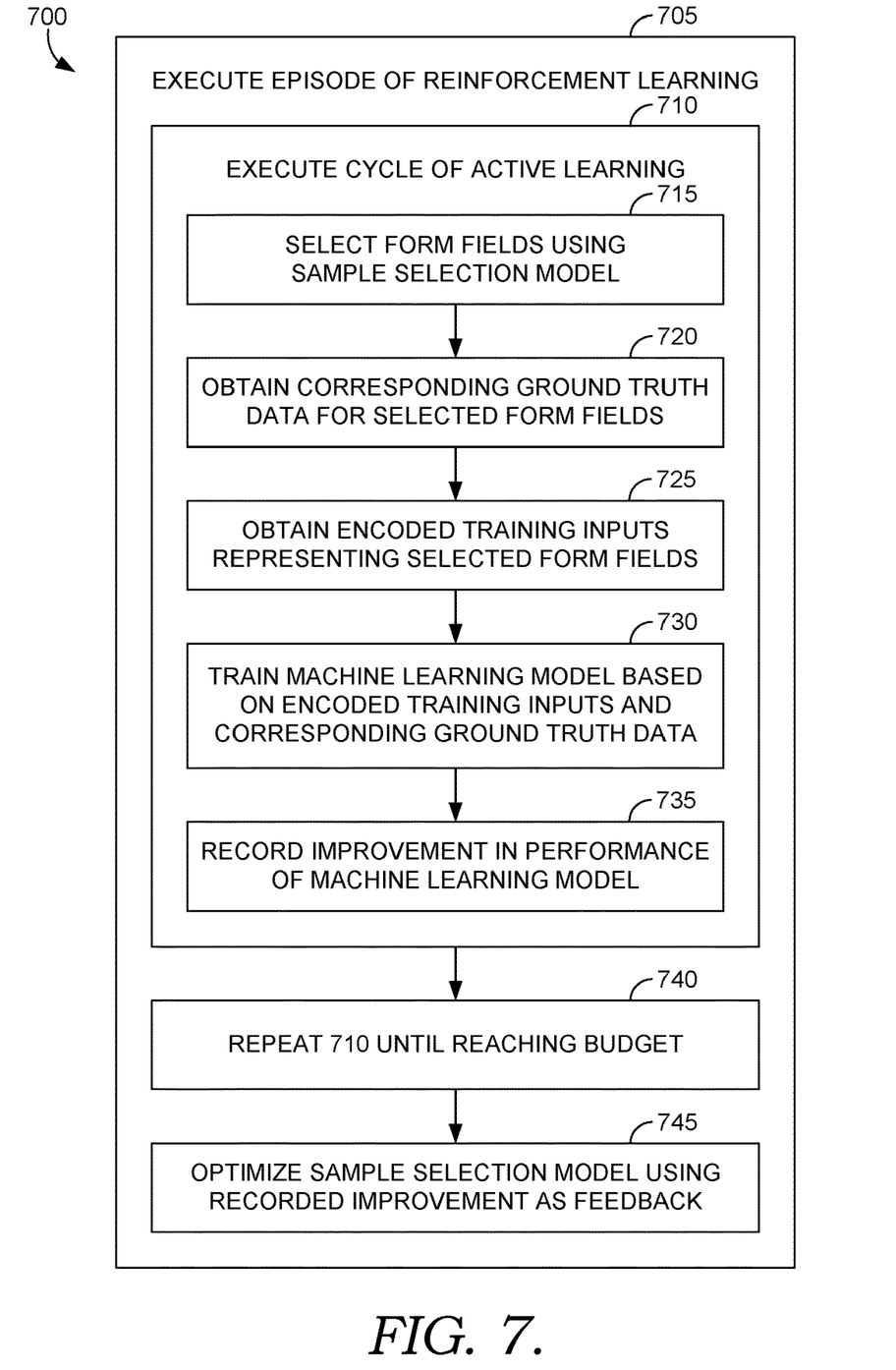
FIG. 7 is a flow diagram showing a method for training a machine learning model to extract a semantic label of a form field using active learning, in accordance with embodiments of the present invention.

With reference now to FIGS. 6-7, flow diagrams are provided illustrating methods for extracting a semantic label for a form field. Each block of the methods 600 and 700 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

Turning initially to FIG. 6, FIG. 6 illustrates a method 600 for extracting a semantic label representing a field type of a fillable widget, in accordance with embodiments described herein. Initially at block 610, a representation of a fillable widget of a form field of an unfilled form is accessed. For example, in some embodiments, a user operating client device 105 of FIG. 1 uses application 110 to access a digital form that includes one or more placeholders for form fields, but lacks metadata or other indication that the placeholders should be treated as form fields. In some cases, one or more form fields are detected (by form field creator 160 of FIG. 1) and/or corresponding fillable widgets are created without semantic labels (e.g., by form field creator 160 or authoring tool 115 of FIG. 1). In some embodiments, a user operating client device 105 uses application 110 to access a digital form to be filled in, and the digital form includes one or more fillable widgets for form fields without semantic labels. As such, a representation of one of the fillable widgets is accessed.

At block 620, an encoded input representing text and layout of a sequence of tokens in a neighborhood of the fillable widget is generated. For example, a sequence of tokens may be constructed by traversing text of the unfilled form in a reading direction (e.g., using coordinates of the bounding boxes to advance from left to right, and from top to bottom), collecting text appearing in sequence with the fillable widget in the unfiled form, and using a special token to represent the location of the fillable widget in the sequence. In some embodiments, for each token in the sequence, any number of embeddings representing different aspects of the token may be identified, extracted, accessed, and/or combined, and the token embeddings for the different tokens in the sequence may be combined to generate the encoded input (e.g., by field sequence encoder 172 of FIG. 1).

At block 630, a machine learning model (e.g., form field classifier 174 of FIG. 1) is used to extract a semantic label representing a field type of the fillable widget. At block 640, execution of an action using the semantic label is caused. In some embodiments (e.g., in a paper form digitization workflow), the action includes configuring the fillable widget to reject inputs having a data type that is inconsistent with the field type of the semantic label. In some embodiments (e.g., in a form fill-assist workflow), the action comprises retrieving a value of completed form field data stored in a profile in association with the semantic label, and auto-filling or auto-suggesting the value of the fillable widget. These are just a few examples, and other executable actions are possible in other implementations.

Turning now to FIG. 7, FIG. 7 illustrates a method 700 for training a machine learning model to extract a semantic label of a form field using active learning, in accordance with embodiments described herein. Blocks 705 and 710-745 represent an example episode of reinforcement learning including multiple cycles of active learning, and blocks 710 and 715-735 represent an example cycle of active learning. At block 715, form fields are selected using a sample selection model. For example, sample selection model 185 of FIG. 1 may select unlabeled form fields from a set of unlabeled forms. At block 720, corresponding ground truth data is obtained for the selected form fields. For example, the selected form fields may be annotated or otherwise associated with corresponding ground truth semantic labels representing field type (e.g., using Amazon Mechanical Turk). At block, 725, encoded training inputs that represent the selected form fields are obtained. In some embodiments, each form field may be (or was previously) converted into a corresponding encoded training input (e.g., by field sequence encoder 172 of FIG. 1). At block 730, a machine learning model is trained (e.g., form field classifier 174 is trained by active learning tool 180 of FIG. 1) based on the encoded training inputs and corresponding ground truth data. At block 735, the improvement in the performance of the machine learning model is recorded (e.g., by active learning tool 180 of FIG. 1).

Block 740 indicates that block 710 is repeated until a desired budget is reached (e.g., a target number of encoded training inputs is used to train the machine learning model). At block 745, the sample selection model is optimized using the recorded improvement as feedback. Block 705 may be repeated over any number of episodes of reinforcement learning terminating, for example, after a certain number of episodes, upon determining that the machine learning model converges (e.g., based on further performance improvements of the machine learning model falling below some threshold), and/or otherwise.

Example Operating Environment

Figure 8:
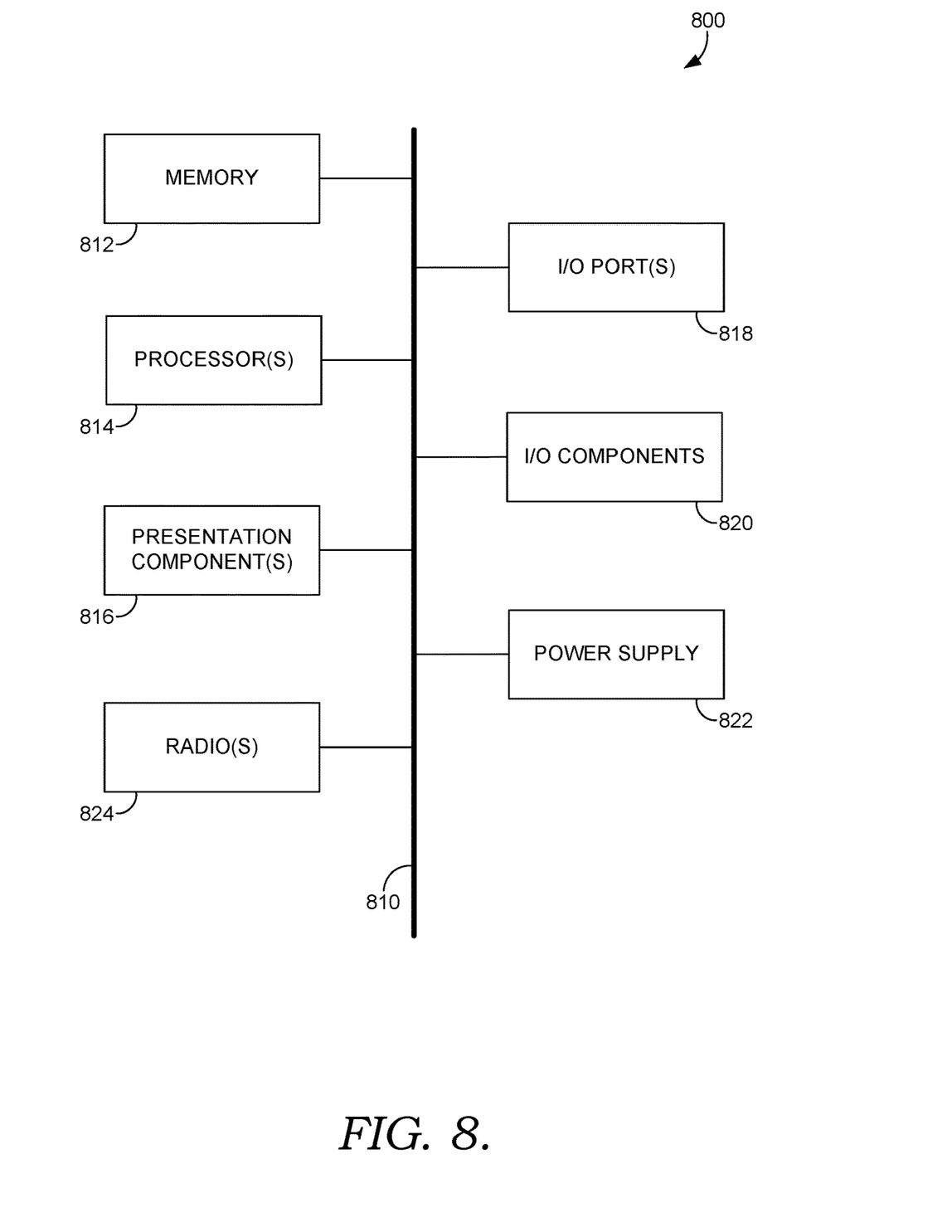
FIG. 8 is a block diagram of an example computing environment suitable for use in implementing embodiments of the present invention.

Having described an overview of embodiments of the present invention, an example operating environment in which some embodiments of the present invention are implemented is described below in order to provide a general context for various aspects of the present invention. Referring now to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

In some embodiments, the present techniques are embodied in computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. Various embodiments are practiced in a variety of system configurations, including hand-held devices, consumer electronics, general-purpose computers, more specialty computing devices, etc. Some implementations are practiced in distributed computing environments where tasks are performed by remote-processing devices that are linked through a communications network.

With reference to the example operating environment illustrated in FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in some cases, it is not possible to delineate clear boundaries for different components. In this case, metaphorically, the lines would be grey and fuzzy. As such, the diagram of FIG. 8 and other components described herein should be understood as merely illustrative of various example implementations, such as an example computing device implementing an embodiment or a portion thereof. Distinction is not made between such categories as "workstation," "server," "laptop," "hand-held device," etc., as all are contemplated within the scope of FIG. 8 and a "computing device."

Computing device 800 typically includes a variety of computer-readable media. Computer-readable media can be any available media that can be accessed by computing device 800 and includes both volatile and nonvolatile media, and removable and non-removable media. By way of non-limiting example, in some cases, computer-readable media comprises computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. In various embodiments, the memory is removable, non-removable, or a combination thereof. Example hardware devices include solid-state memory, hard drives, optical-disc drives, etc. Computing device 800 includes one or more processors that read data from various entities such as memory 812 or I/O components 820. Presentation component(s) 816 present data indications to a user or other device. Example presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs are transmitted to an appropriate network element for further processing. In some embodiments, an NUI implements any combination of speech recognition, stylus recognition, facial recognition, biometric recognition, gesture recognition both on screen and adjacent to the screen, air gestures, head and eye tracking, and/or touch recognition (as described in more detail below) associated with a display of computing device 800. In some cases, computing device 800 is equipped with depth cameras, such as stereoscopic camera systems, infrared camera systems, RGB camera systems, touchscreen technology, and combinations of these, for gesture detection and recognition. Additionally or alternatively, the computing device 800 is equipped with accelerometers or gyroscopes that enable detection of motion, and in some cases, an output of the accelerometers or gyroscopes is provided to the display of computing device 800 to render immersive augmented reality or virtual reality.

Embodiments described herein support extraction of semantic labels for form fields. The components described herein refer to integrated components of a semantic label extraction system. The integrated components refer to the hardware architecture and software framework that support functionality using the semantic label extraction system. The hardware architecture refers to physical components and interrelationships thereof and the software framework refers to software providing functionality that can be implemented with hardware embodied on a device.

In some embodiments, the end-to-end software-based system operates within the components of the semantic label extraction system to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. In some cases, low-level software written in machine code provides more complex functionality to higher levels of software. As used herein, computer-executable instructions includes any software, including low-level software written in machine code, higher level software such as application software and any combination thereof. In this regard, system components can manage resources and provide services for the system functionality. Any other variations and combinations thereof are contemplated with embodiments of the present invention.

Some embodiments are described with respect a neural network, a type of machine-learning model that learns to approximate unknown functions by analyzing example (e.g., training) data at different levels of abstraction. Generally, neural networks model complex non-linear relationships by generating hidden vector outputs along a sequence of inputs. In some cases, a neural network includes a model of interconnected digital neurons that communicate and learn to approximate complex functions and generate outputs based on a plurality of inputs provided to the model. In various implementations, a neural network includes any of a variety of deep learning models, including convolutional neural networks, recurrent neural networks, deep neural networks, and deep stacking networks, to name a few examples. In some embodiments, a neural network includes or otherwise makes use of one or more machine learning algorithms to learn from training data. In other words, a neural network can include an algorithm that implements deep learning techniques such as machine learning to attempt to model high-level abstractions in data. An example implementation may include a convolutional neural network including convolutional layers, pooling layers, and/or other layer types.

Although some implementations are described with respect to neural networks, some embodiments are implemented using other types of machine learning model(s), such as those using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. For purposes of this disclosure, words such as "a" and "an," unless otherwise indicated to the contrary, include the plural as well as the singular. Thus, for example, the requirement of "a feature" is satisfied where one or more features are present.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method comprising:
    accessing, by a processing device, a representation of a fillable widget of a form field of an unfilled form;
    generating, by the processing device, an encoded input representing text and layout of a sequence of tokens surrounding the fillable widget,
        wherein the sequence of tokens comprises (a) a set of the tokens representing words preceding and following the fillable widget and (b) a special token that represents the fillable widget;
    using, by the processing device, a machine learning model to extract a semantic label representing a field type of the fillable widget in view of the encoded input; and
    causing, by the processing device, execution of an action using the semantic label.

2. The method of claim 1, wherein using the machine learning model to extract the semantic label comprises:
    generating, by a first neural network of the machine learning model, a contextual embedding of the sequence;
    identifying a subset of the contextual embedding corresponding to a position of the fillable widget in the sequence; and
    extracting the semantic label by passing the subset of the contextual embedding corresponding to the fillable widget through a second neural network of the machine learning model comprising a multi-class classifier.

3. The method of claim 1, wherein the semantic label is part of a hierarchical taxonomy of multiple levels of semantic labels of form fields, wherein the machine learning model comprises a multi-class classifier with a number of classes that corresponds to a lowest level of the hierarchical taxonomy.

4. The method of claim 1, wherein the action comprises configuring the fillable widget to reject inputs having a data type that is inconsistent with the field type of the semantic label.

5. The method of claim 1, wherein the action comprises retrieving a value of completed form field data stored in a profile in association with the semantic label, and auto-filling or auto-suggesting the value of the fillable widget.

6. The method of claim 1, wherein generating the encoded input comprises:
for each of the tokens, generating a plurality of embeddings representing different aspects of the token and combining the plurality of embeddings into a token embedding; and
generating the encoded input by combining the token embedding for each of the tokens.

7. The method of claim 1, wherein the encoded input represents text and layout of multiple fillable widgets within the sequence, and wherein using the machine learning model to extract the semantic label extracts a corresponding semantic label for each of the multiple fillable widgets.

8. The method of claim 1, further comprising training the machine learning model to extract semantic labels from unfilled forms using an active learning pipeline configured to select training form fields using a sample selection model, train the machine learning model using encoded training inputs representing the training form fields, and optimize the sample selection model using a performance improvement of the machine learning model as a reward.

9. A system comprising one or more hardware processors and memory coupled to the one or more hardware processors, the one or more hardware processors to perform operations comprising:
accessing a representation of a fillable widget of a form field of an unfilled form;
triggering extraction, by a machine learning model in view of an encoded input representing text and layout of a sequence of tokens surrounding the fillable widget, of a semantic label representing a field type of the fillable widget,
wherein the sequence of tokens comprises (a) a set of the tokens representing words preceding and following the fillable widget and (b) a special token that represents the fillable widget; and
causing execution of an action using the semantic label.

10. The system of claim 9, wherein the extraction by the machine learning model comprises:
generating, by a first neural network of the machine learning model, a contextual embedding of the sequence;
identifying a subset of the contextual embedding corresponding to a position of the fillable widget in the sequence; and
extracting the semantic label by passing the subset of the contextual embedding corresponding to the fillable widget through a second neural network of the machine learning model comprising a multi-class classifier.

11. The system of claim 9, wherein the semantic label is part of a hierarchical taxonomy of multiple levels of semantic labels of form fields, wherein the machine learning model comprises a multi-class classifier with a number of classes that corresponds to a lowest level of the hierarchical taxonomy.

12. The system of claim 9, wherein the action comprises configuring the fillable widget to reject inputs having a data type that is inconsistent with the field type.

13. The system of claim 9, wherein the action comprises retrieving a value of completed form field data stored in a profile in association with the semantic label, and auto-filling or auto-suggesting the value of the fillable widget.

14. The system of claim 9, the operations further comprising:
for each of the tokens, triggering generation of a plurality of embeddings representing different aspects of the token and combining the plurality of embeddings into a token embedding; and
triggering combination of the token embedding for each of the tokens to generate the encoded input.

15. The system of claim 9, wherein the encoded input represents text and layout of multiple fillable widgets within the sequence, and wherein the extraction by the machine learning model extracts a corresponding semantic label for each of the multiple fillable widgets.

16. The system of claim 9, wherein the machine learning model is trained to extract semantic labels from unfilled forms using an active learning pipeline configured to select training form fields using a sample selection model, train the machine learning model using encoded training inputs representing the training form fields, and optimize the sample selection model using a performance improvement of the machine learning model as a reward.

17. A non-transitory computer-readable storage medium storing computer-executable instructions that, when executed by a processing device, cause the processing device to:
receive, into a machine learning model, an encoded training input representing text and layout of a sequence of tokens surrounding a fillable widget of a form field of an unfilled training form,
wherein the sequence of tokens comprises (a) a set of the tokens representing words preceding and following the fillable widget and (b) a special token that represents the fillable widget; and
train the machine learning model based on the encoded training input to generate a trained machine learning model that extracts a semantic label representing a field type of the fillable widget in view of the encoded training input.

18. The non-transitory computer-readable storage medium of claim 17, wherein the computer-executable instructions, when executed by the processing device, further cause the processing device to train the machine learning model using an active learning pipeline configured to:
select the form field using a sample selection model;
train the machine learning model based on the encoded training input; and
optimize the sample selection model using a performance improvement of the machine learning model as a reward.

19. The non-transitory computer-readable storage medium of claim 17, wherein the trained machine learning model is configured to extract a particular semantic label of a particular fillable widget of a particular form field of an unfilled form.

\* \* \* \* \*